3,350,208
METHOD OF MAKING A CANNED, BAKED PIE
Edward E. Colby and Richard E. Hager, Cincinnati, Ohio, assignors to The Procter & Gamble Company, Cincinnati, Ohio, a corporation of Ohio
No Drawing. Filed Dec. 22, 1964, Ser. No. 420,429
13 Claims. (Cl. 99—92)

This invention relates to canned pies. More particularly, this invention relates to a novel method of making a canned baked pie which can be stored for substantial periods of time at normal room temperatures (70° F. to 90° F.) without refrigeration.

Commercial pastry products such as pies and tarts which are packaged in containers for distribution and storage are sold both in the backed and unbaked state. Packaged pies sold in the unbaked state usually require refrigeration temperatures from about 40° F. to 50° F. or lower temperatures to freeze the pie to prevent spoilage during storage. Baked pies, if not stored under refrigeration, generally are kept on the retail shelf for only a few days and, more usually, are made available to the consumer fresh daily.

Some attempts have been made to market non-refrigerated canned pies which are in an unbaked state. Although these canned products do not require refrigeration, they do require baking by the consumer after the can is opened. These products have not met with much commercial success.

It is an object of this invention to provide a novel method of making a canned, baked pie which can be stored for substantial periods of time at normal room temperatures (70° F. to 90° F.) without refrigeration.

It is a further object to provide a method of making a storage-stable, canned pie comprising a pastry shell and a filling which is completely baked and which can be eaten immediately upon removal from the sealed container or with only minimal heating of the pie to suit the individual taste.

Other objects and advantageous features will be apparent from the following detailed description.

The method of making the canned, baked pie of this invention comprises the following steps: (1) preparing an acidulated pastry dough having a pH of from about 4 to about 4.7 and comprising by weight of the dough from about 40% to about 60% flour, from about 20% to about 45% shortening, and from about 13% to about 20% water; (2) placing the dough in the form of a shell in the bottom part of a sanitary open-top can and partially baking the shell while in the can for about 8 to about 12 minutes at a temperature of from about 400° F. to about 500° F.; (3) placing in the partially baked pastry shell a preheated pastry filling having a temperature of from about 150° F. to about 250° F.; (4) preferably affixing a sheet of dough, either unbaked or pre-baked, over the filling, said dough sheet having the composition and pH of the dough recited in part (1); (5) baking the complete pie while in the unsealed open-top can with sufficient heat to provide a temperature of the pie of from about 190° F. to about 250° F. for a period of from about 20 to about 60 minutes; and (6) hermetically sealing the top of the can with a sterile lid while the can and contents are at a temperature of at least about 190° F.

It is preferable to exclude air from the canned pie by displacement and blanketing with an atmosphere of nitrogen or other inert gas during the hermetic sealing step in order to improve the resistance to microbiological spoilage and the development of off-flavors and odors.

Flours suitable for use in the practice of this invention include those commonly used for pastry doughs. All-purpose flours and unbleached pastry flours are most satisfactory, although bread and cake flours can be used.

Shortenings which can be employed include shortenings suitable for use in pastry products. These shortenings can be composed of saturated or unsaturated animal, vegetable or marine fats and oils. Conventionally used lard and hydrogenated vegetable oils such as hydrogenated cottonseed, soybean, corn, peanut, coconut and rapeseed oils are illustrative of the plastic or hardened types of shortening generally used for pastry doughs. Additionally, the pourable shortenings described in U.S. Patent 3,116,149, granted to Ralph E. Luedtke, Dec. 31, 1963, and the rearranged lard shortenings described in U.S. Patents 2,875,066–7, granted to George W. Holman and Louis H. Going, Feb. 24, 1959, can be used in the preparation of the pastry doughs used in this invention. Other shortenings composed of glycerides, particularly triglycerides, containing fatty acid radicals having from about 12 to about 22 carbon atoms can also be used in the practice of this invention.

Usually, a small percentage of salt (for example, about 1% by weight of the dough), is included in the dough although this is not essential for the preparation of the pastry doughs used in this invention. Various other minor ingredients can also be used in the dough formulas, if desired, for example, non-fat dry milk solids, sugar such as sucrose or dextrose, egg solids, emulsifiers, and microbiological growth inhibitors.

The mixing of the dough can be conducted according to various procedures, depending upon the character of crust desired, that is, whether it is to be fine-grained, moderately flaky, or very flaky. The fine-grained crust will generally entail a more complete mixing of the flour and shortening whereas for the more flaky-type crust a lighter mixing of the flour and shortening is preferred. In the mixing of the dough for the canned, baked pie of this invention, it is preferable to use the above-described proportions of flour, shortening, and water in order to obtain the desirable results described herein.

As an example of the mixing for a very flaky crust, a fairly firm plastic shortening is cut into an unbleached pastry flour in very small pieces about the size of small peas in the proportions described above and the two ingredients are gently mixed together, for example, in a mixing bowl with a pastry blender. Small increments of water are then mixed in until the mass forms a workable pastry dough. The dough is then divided into two parts, one part for the lower pastry shell and the side walls, the other part for the top crust. Each portion is then rolled on a pastry board with short, light strokes, rolling from the center to the edges, keeping the dough circular in shape. For a 9-inch pie, the dough is rolled out in a sheet of about 11 inches in diameter for the lower crust and about 10 inches in diameter for the top crust. Other size pie crusts vary accordingly. In making these pie crusts on a commercial scale, the lower pastry shell and top crust can be cut from a large sheet, for example.

In the mixing of the dough as above-described, the dough is acidulated with an edible acid to provide a pH of from about 4 to about 4.7. Heretofore, customary practice with pastry doughs has been to maintain the pH of the dough in the range of about 7.5 to 8.5. The acidulation can be accomplished by the use of edible acids, for example, such as those selected from the group consisting of acetic, citric, fumaric, lactic, malic, and phosphoric acids and mixtures thereof. Such acidulation has been found necessary to provide the desirable properties of the canned, baked pie and is done particularly for improving shelf-life and resistance to microbiological growth. The pH of the dough is preferably controlled by incorporating one or more of these and similar edible acids in the water component of the dough.

Instead of baking the complete pie, that is, both the lower pastry shell and the top crust with the enclosed filling, in an oven at one time, it is necessary according to the method of this invention to first partially bake the bottom crust or lower pastry shell in an oven for about 8 to about 12 minutes at a temperature of from about 400° F. to about 500° F. This initial baking helps to reduce the crust soakage of the preheated pastry filling which is subsequently placed in the lower pasry shell. In order to achieve the desirable canned, baked pie results of this invention, it is also preferable to bake the lower pastry shell in the bottom portion of the open-top can in which the finished pie is to be stored rather than in a separate pie container.

After the initial baking of the lower pastry shell, a preheated pastry filling is placed in the partially-baked shell. The filling for the pastry shell is of a type generally associated with baked pies and pastries such as those selected from the group consisting of fruit, cream, custard, chiffon, vegetable and meat fillings. Examples of suitable fruits for the pastry fillings of this invention are apples, cherries, peaches, and berries such as blueberries and strawberries. By the term "cream filling" is meant fillings such as for lemon cream, banana cream, and coconut cream pies. Chiffon fillings include those having a light delicate texture such as achieved by adding whipped egg whites or whipped gelatin, for example, lemon chiffon pie fillings. Chicken, beef, and vegetable beef are illustrative examples of the vegetable and meat pie fillings which can be used in the practice of this invention.

It is necessary to preheat the pastry filling to a temperature of from about 150° F. to about 250° F. prior to placing the filling in the pastry shell. This preheating aids in the sterilization of the pastry filling. The preheating is an essential step and must be carried out in place of conventional heat treatment of the sealed can since the latter treatment has been found to have a harmful effect upon the appearance of the final product, in terms of texture and color, as well as a detrimental effect upon the eating quality of the final product.

After the preheated filling has been placed in the lower pastry shell, a sheet of dough as prepared above is placed over the filling and affixed to the side walls of the lower shell at the edge of the can with an edible adhesive material, such as a flour-water paste, to form a top crust. Small holes are usually pricked in the covering dough sheet to permit the escape of steam during the subsequent baking. In the case of cream and chiffon fillings, the latter step of covering the filling with a sheet of dough is generally omitted. The sheet of dough used to cover the filling can also be pre-baked for a period of about 8 to about 12 minutes at a temperature of from about 400° F. to about 500° F. to give it the same partially baked consistency as the lower pastry shell prior to the final baking step.

The complete pie in the unsealed open-top can is then given a final baking in an oven with sufficient heat to provide a temperature of the pie of from about 109° F. to about 250° F. for a period of from about 20 minutes to about 60 minutes. These time and temperature conditions are essential not only to complete the baking but also to obtain sufficient sterility of product. An oven temperature of from about 400° F. to about 500° F. generally will provide sufficient heat to the pie as required above.

It is preferable to conduct the above final baking of the pie for about 40 minutes to about 60 minutes. In order to prolong the baking for such extended periods of time it is preferred to place a temporary cover over the pie such as an aluminum foil to prevent excessive browning and drying. The foil is removed after completion of the baking and prior to sealing of the can. After completion of the above final baking step, the top of the can is hermetically sealed with a sterile lid while the can and contents have a temperature of at least about 190° F. Temperatures in the range of from about 190° F. to about 250° F. generally are preferred during the can sealing step. The canned pie is cooled at room temperature and then is ready to be stored for extended periods of time without any further heat treatment and without any refrigeration during storage.

The method of this invention is particularly well adapted for the fully automatic production of canned, baked pies. In this instance, the dough and filling are prepared in large quantities, the pies are prebaked, filled and finally baked in tunnel ovens in a continuous manner, and the cans are sealed with fully automatic canning equipment.

The following examples illustrate several specific embodiments of the invention. All percentages and parts are by weight unless otherwise specified.

EXAMPLE 1

A pastry dough was made having the following composition:

| | Parts |
|---|---|
| Unbleached pastry flour | 205 |
| Shortening [1] | 131 |
| Water | 60 |
| Salt (sodium chloride) | 5.1 |
| Glacial acetic acid | 2 |

[1] The shortening used in this example was a plastic shortening consisting of 95% directed rearranged lard (produced by the method described in U.S. Patent 2,875,066, granted to Holman and Going, Feb. 24, 1959) hardened to a solids content index (SCI) of 20 at 70° F., 4% soybean oil hardened to a solids content index of 3 at 70° F., and 1% cottonseed triglyceride hardened to an iodine value of about 8.

The above materials were gently mixed in a stainless steel bowl with an electric mixer at medium speed for about 5 minutes and then hand rolled into a mass having the shape of a large roll of bread dough. The acetic acid in the dough was sufficient to provide a pH of 4.2. The dough was separated into two parts and each part was rolled into a sheet of about one square foot in size. One sheet was used to form the lower pastry shell and placed in an open-top sanitary can fabricated from soft aluminum sheet. The can had the shape of a pie tin and was sized to take a 603 diameter (#10 size) lid. The lower pastry shell was then baked in the open-top can for about 9 minutes in an electric oven having a temperature of 450° F. An apple pie filling consisting of peeled, cored, segmented, and canned apples flavored with salt, sugar, and cinnamon, and fortified with cornstarch, was pre-heated in a separate container to a temperature of about 160° F. and then placed in the previously partially baked lower pastry shell. The second dough sheet was affixed to the top of the pie with flour-water paste. The entire pie was then baked in an electric oven having a temperature of 450° F. for a period of 25 minutes. A piece of aluminum foil was placed over the top of the pie and baking was continued for an additional 15 minutes at the same oven temperature. During the baking, the pastry crust and filling had a temperature of from about 190° F. to about 250° F. for a period of about 30 minutes. The baked pie was removed from the oven, covered with a sterile lid, and then immediately hermetically sealed with a semi-automatic table top sealer. The canned pie was allowed to cool at room temperature and placed in storage at ordinary room temperature (about 70° F.). During three months storage at this temperature, the canned pie retained good pie shape and eating quality as visually and gustatorily determined. Even better eating quality results are obtained by excluding air by displacement and blanketing with nitrogen during the can sealing step.

Results similar to those described above are obtained with strawberry, custard, banana cream, lemon chiffon, and vegetable beef filling instead of apple pie filling. Similar good baking results can be obtained with citric, fumaric, lactic, malic, and phosphoric acids in place of the acetic acid in the above example. Similar good results can also be obtained with partially hydrogenated vegetable oil (85% soybean and 15% cottonseed oils—iodine value about 75) in place of the lard in the above example.

EXAMPLE 2

Example 1 was repeated except that the sheet of dough used to cover the filling was pre-baked for 9 minutes in an oven having a temperature of 450° F. The final baked pie was of similar good storage stability and eating quality as the baked pie of Example 1.

Good results are obtained with similar pies as above without the top crust, but it is preferable to use a top crust.

Variations and modifications of the present invention can be made upon a study of the foregoing disclosure by those skilled in the art. Such variations and modifications are intended to be within the spirit and scope of the invention as defined in the appended claims.

What is claimed is:

1. The method of making a canned, baked pie which can be stored for substantial periods of time at normal room temperatures without refrigeration comprising:
   (1) preparing an acidulated pastry dough having a pH of from about 4 to about 4.7 and comprising by weight of the dough from about 40% to about 60% flour, from about 20% to about 45% shortening, and from about 13% to about 20% water;
   (2) placing the dough in the form of a shell in the bottom part of a sanitary open-top can and partially baking the shell while in the can for about 8 to 12 minutes at a temperature of from about 400° F. to about 500° F.;
   (3) placing in the partially baked pastry shell a preheated pastry filling having a temperature of from about 150° F. to about 250° F.;
   (4) baking the complete pie while in an unsealed open-type can with sufficient heat to provide a temperature of the pie of from about 190° F. to about 250° F. for a period of from about 20 to about 60 minutes; and
   (5) hermetically sealing the top of the can with a sterile lid while the can and contents are at a temperature of at least about 190° F.

2. The method of claim 1 in which the dough is acidulated with an acid selected from the group consisting of acetic, citric, fumaric, lactic, malic, and phosphoric acids, and mixtures thereof.

3. The method of claim 1 in which the shortening is a plastic shortening.

4. The method of claim 1 in which air is excluded from the canned pie by displacement and blanketing with inert gas during the hermetic sealing step.

5. The method of claim 1 in which the pastry filling is selected from the group consisting of fruit, cream, custard, chiffon, vegetable and meat fillings.

6. The method of claim 5 in which the pastry filling comprises apples.

7. The method of making a canned, baked pie which can be stored for substantial periods of time at normal room temperatures without refrigeration comprising:
   (1) preparing an acidulated dough having a pH of from about 4 to about 4.7 comprising by weight of the dough from about 40% to about 60% flour, from about 20% to about 45% shortening, and from about 13% to about 20% water;
   (2) placing the dough in the form of a shell in the bottom part of a sanitary open-top can and partially baking the shell while in the can for about 8 to about 12 minutes at a temperature of from about 400° F. to about 500° F.;
   (3) placing in the partially baked pastry shell a preheated pastry filling having a temperature of from about 150° F. to about 250° F.;
   (4) affixing a sheet of dough over the filling, said dough sheet having the composition and pH of the dough recited in part (1);
   (5) baking the complete pie while in the unsealed open-top can with sufficient heat to provide a temperature of the pie of from about 190° F. to about 250° F. for a period of from about 20 to about 60 minutes; and
   (6) hermetically sealing the top of the can with a sterile lid while the can and contents are at a temperature of at least about 190° F.

8. The method of claim 7 in which the dough is acidulated with an acid selected from the group consisting of acetic, citric, fumaric, lactic, malic, and phosphoric acids and mixtures thereof.

9. The method of claim 7 in which the shortening is a plastic shortening.

10. The method of claim 7 in which air is excluded from the canned pie by displacement and blanketing with inert gas during the hermetic sealing step.

11. The method of claim 7 wherein the sheet of dough recited in part (4) is pre-baked for about 8 to about 12 minutes at a temperature of from about 400° F. to about 500° F.

12. The method of claim 7 in which the pastry filling is selected from the group consisting of fruit, cream, custard, chiffon, vegetable and meat fillings.

13. The method of claim 12 in which the pastry filling comprises apples.

References Cited

UNITED STATES PATENTS

| | | |
|---|---|---|
| 2,160,783 | 5/1939 | McDonald. |
| 2,363,395 | 11/1944 | Calia _____ 99—86 |
| 2,836,498 | 5/1958 | Fennema _____ 99—199 |
| 2,845,356 | 7/1958 | Battiste _____ 99—92 XR |
| 2,965,501 | 12/1960 | Harriss _____ 99—192 |

RAYMOND N. JONES, *Primary Examiner.*